United States Patent
Berthold et al.

(10) Patent No.: US 9,000,095 B2
(45) Date of Patent: *Apr. 7, 2015

(54) POLYETHYLENE MOLDING COMPOSITION FOR PRODUCING INJECTION-MOLDED FINISHED PARTS

(75) Inventors: Joachim Berthold, Kelkheim (DE); Heinz Vogt, Frankfurt (DE); James Stern, Houston, TX (US); Albert Weber, Cervelló (ES)

(73) Assignee: Basell Polyolefine GmbH, Wesseling (DE)

( * ) Notice: Subject to any disclaimer, the term of this patent is extended or adjusted under 35 U.S.C. 154(b) by 545 days.

This patent is subject to a terminal disclaimer.

(21) Appl. No.: 11/922,667

(22) PCT Filed: Jun. 27, 2006

(86) PCT No.: PCT/EP2006/063580
§ 371 (c)(1),
(2), (4) Date: Dec. 20, 2007

(87) PCT Pub. No.: WO2007/003530
PCT Pub. Date: Jan. 11, 2007

(65) Prior Publication Data
US 2010/0010163 A1    Jan. 14, 2010

(30) Foreign Application Priority Data
Jun. 30, 2005  (DE) .......................... 10 2005 030 941

(51) Int. Cl.
C08L 23/08 (2006.01)
C08F 210/16 (2006.01)
C08F 297/08 (2006.01)
C08L 23/06 (2006.01)

(52) U.S. Cl.
CPC ............ *C08F 297/083* (2013.01); *C08F 210/16* (2013.01); *C08F 297/08* (2013.01); *C08L 23/06* (2013.01); *C08L 23/08* (2013.01); *C08L 23/0815* (2013.01); *C08L 2205/02* (2013.01); *C08L 2205/03* (2013.01); *C08L 2314/02* (2013.01)

(58) Field of Classification Search
CPC ............ C08L 2205/03; C08L 2205/02; C08L 2314/02; C08L 223/08; C08F 210/16; C08F 297/08
USPC .................................. 525/191, 240
See application file for complete search history.

(56) References Cited

U.S. PATENT DOCUMENTS

| | | | |
|---|---|---|---|
| 3,718,634 A * | 2/1973 | Schultz | .......... 526/189 |
| 4,336,352 A | 6/1982 | Sakurai et al. | |
| 4,447,587 A | 5/1984 | Berthold et al. | |
| 4,536,550 A * | 8/1985 | Moriguchi et al. | .......... 525/240 |
| 5,189,106 A | 2/1993 | Morimoto et al. | |
| 5,258,161 A | 11/1993 | Ealer | |
| 5,338,589 A | 8/1994 | Böhm et al. | |
| 5,350,804 A | 9/1994 | Takita et al. | |
| 5,350,807 A | 9/1994 | Pettijohn et al. | |
| 5,405,922 A | 4/1995 | DeChellis et al. | |
| 5,422,400 A | 6/1995 | Kamiyama et al. | |
| 5,648,309 A * | 7/1997 | Bohm | .......... 502/105 |
| 5,663,236 A | 9/1997 | Takahashi et al. | |
| 5,684,097 A | 11/1997 | Palmroos et al. | |
| 5,882,750 A | 3/1999 | Mink et al. | |
| 5,908,679 A | 6/1999 | Berthold et al. | |
| 5,925,448 A | 7/1999 | Moy et al. | |
| 6,084,048 A | 7/2000 | Iiozumi et al. | |
| 6,136,924 A | 10/2000 | Promel | |
| 6,180,736 B1 | 1/2001 | Muhle et al. | |
| 6,185,349 B1 | 2/2001 | Dammert et al. | |
| 6,221,982 B1 | 4/2001 | Debras et al. | |
| 6,225,410 B1 | 5/2001 | Sugimura et al. | |
| 6,242,548 B1 | 6/2001 | Duchesne et al. | |
| 6,291,590 B1 | 9/2001 | Sainio et al. | |
| 6,329,054 B1 | 12/2001 | Rogestedt et al. | |
| 6,407,185 B1 | 6/2002 | Promel | |
| 6,423,808 B1 | 7/2002 | Watanabe et al. | |
| 6,433,095 B1 | 8/2002 | Laurent | |
| 6,455,638 B2 | 9/2002 | Laughner et al. | |

(Continued)

FOREIGN PATENT DOCUMENTS

| | | |
|---|---|---|
| DE | 19945980 | 3/2001 |
| DE | 10259491 | 7/2004 |

(Continued)

OTHER PUBLICATIONS

Chiang Journal of Polymer Science XXXVI, 91-103 (1959).*
Peacock "The Handbook of Polyethylene" 2000.*
M. Fleissner, "Slow Crack Growth and Creep Rupture Strength of Polyethylene Pipe," *Kunststoffe German Plastics*, vol. 77, p. 45-50 (1987) with English language translation.

*Primary Examiner* — Mark Kaucher

(57) ABSTRACT

The invention relates to a polyethylene molding composition which has a multimodal molecular mass distribution and comprises a low molecular weight ethylene homopolymer A, a high molecular weight ethylene copolymer B and an ultra-high molecular weight ethylene copolymer C. The molding composition has a density at a temperature of 23° C. in the range from 0.940 to 0.957 g/cm$^3$, an MFR (190° C./2.16 kg) in the range from 0.5 to 4 dg/min and a viscosity number VN$_3$ of the mixture of ethylene homopolymer A, copolymer B and ethylene copolymer C, measured in accordance with ISO/R 1191 in decalin at a temperature of 135° C., in the range from 150 to 300 cm$^3$/g. The invention further relates to the use of such a molding composition for producing injection-molded finished parts, and to finished parts produced by injection molding.

3 Claims, No Drawings

(56) References Cited

U.S. PATENT DOCUMENTS

| | | |
|---|---|---|
| 6,479,589 B2 | 11/2002 | Debras et al. |
| 6,492,475 B1 | 12/2002 | Egashira et al. |
| 6,509,106 B1 | 1/2003 | Edwards et al. |
| 6,586,541 B2 | 7/2003 | Citron |
| 6,635,705 B2 | 10/2003 | Itoh et al. |
| 6,642,323 B1 | 11/2003 | Myhre et al. |
| 6,645,588 B1 | 11/2003 | Leiden et al. |
| 6,649,698 B1 | 11/2003 | Mehta |
| 6,713,561 B1 * | 3/2004 | Berthold et al. ............... 525/191 |
| 6,770,341 B1 | 8/2004 | Bohm et al. |
| 6,777,498 B2 | 8/2004 | Imai et al. |
| 6,787,608 B2 | 9/2004 | VanDun et al. |
| 6,803,418 B2 | 10/2004 | Kobayashi et al. |
| 6,900,266 B2 | 5/2005 | Raty |
| 7,101,939 B2 | 9/2006 | Nowlin et al. |
| 7,250,473 B2 | 7/2007 | Schramm et al. |
| 7,250,474 B2 | 7/2007 | Maziers |
| 7,427,649 B2 | 9/2008 | Berthold et al. |
| 2001/0012562 A1 | 8/2001 | Nakagawa et al. |
| 2006/0052542 A1 | 3/2006 | Berthold et al. |
| 2006/0074193 A1 | 4/2006 | Berthold et al. |
| 2006/0074194 A1 | 4/2006 | Berthold et al. |
| 2008/0090968 A1 | 4/2008 | Berthold et al. |
| 2008/0139750 A1 | 6/2008 | Berthold et al. |
| 2008/0166535 A1 | 7/2008 | Berthold et al. |
| 2008/0199674 A1 | 8/2008 | Berthold et al. |
| 2008/0274353 A1 | 11/2008 | Vogt et al. |
| 2009/0105422 A1 | 4/2009 | Berthold et al. |

FOREIGN PATENT DOCUMENTS

| | | | |
|---|---|---|---|
| EP | 68257 | 1/1983 | |
| EP | 129312 | 12/1984 | |
| EP | 401776 | 12/1990 | |
| EP | 492656 | 7/1992 | |
| EP | 532551 | 3/1993 | |
| EP | 739937 | 10/1996 | |
| EP | 797599 | 10/1997 | |
| EP | 0856526 A1 | 8/1998 | |
| EP | 905151 | 3/1999 | |
| EP | 1192216 | 4/2002 | |
| EP | 1266738 | 12/2002 | |
| EP | 603935 | 6/2004 | |
| GB | 2056996 | 3/1981 | |
| WO | 91/18934 | 12/1991 | |
| WO | WO 9118934 A1 * | 12/1991 | ............. C08F 4/654 |
| WO | 9703124 | 1/1997 | |
| WO | 9703139 | 1/1997 | |
| WO | 01/02480 | 1/2001 | |
| WO | 01/23446 | 4/2001 | |
| WO | 2004/056921 | 7/2004 | |
| WO | 2004/058876 | 7/2004 | |
| WO | 2004/058877 | 7/2004 | |
| WO | 2004/058878 | 7/2004 | |
| WO | 2006/053740 | 5/2006 | |
| WO | 2006/053741 | 5/2006 | |
| WO | 2006/092377 | 9/2006 | |
| WO | 2006/092378 | 9/2006 | |
| WO | 2006/092379 | 9/2006 | |
| WO | 2007/022908 | 3/2007 | |

* cited by examiner

POLYETHYLENE MOLDING COMPOSITION FOR PRODUCING INJECTION-MOLDED FINISHED PARTS

This application is the U.S. national phase of International Application PCT/EP2006/063580, filed Jun. 27, 2006, claiming priority to German Patent Application 102005030941.0 filed Jun. 30, 2005; the disclosures of International Application PCT/EP2006/063580 and German Patent Application 102005030941.0, each as filed, are incorporated herein by reference.

DESCRIPTION

The present invention relates to a polyethylene molding composition which has a multimodal molecular mass distribution and is particularly suitable for producing injection-molded finished parts, for example closures and bottles, and to a process for preparing this molding composition in the presence of a suitable catalyst, preferably a Ziegler catalyst.

The invention further relates to the use of such a molding composition for producing injection-molded finished parts, and to finished parts produced by injection-molding processes.

The expressions "polyethylene molding composition which has a multimodal molecular mass distribution" or simply "multimodal polyethylene" refer to a polyethylene molding composition or a polyethylene having a molecular mass distribution curve of multimodal configuration, i.e. a polyethylene comprising a plurality of ethylene polymer fractions having distinct molecular weights. For example, according to a preferred embodiment of the present invention, a multimodal polyethylene can be prepared via a multistage reaction sequence comprising successive polymerization steps carried out under predetermined different reaction conditions in respective reactors arranged in series so as to obtain respective polyethylene fractions having different molecular weights. A process of this type can be performed in a suspension medium: in this case, monomers and a molar mass regulator, preferably hydrogen, are firstly polymerized in a first reactor under first reaction conditions in the presence of a suspension medium and a suitable catalyst, preferably a Ziegler catalyst, then transferred to a second reactor and further polymerized under second reaction conditions, and, if the polyethylene to be prepared is for example trimodal, further transferred to a third reactor and further polymerized under third reaction conditions, with the first reaction conditions differing from the second and third reaction conditions so as to obtain three polyethylene fractions having different molecular weights. This difference in molecular weight in the different ethylene polymer fractions is normally evaluated through the weight average molecular weight $M_w$.

Although Ziegler catalysts are particularly suitable for the preferred applications of the present invention, it is also possible to use other catalysts, for example catalysts having a uniform catalyst center (or "single site" catalysts), e.g. metallocene catalysts.

Polyethylene is widely used for producing injection-molded finished parts. The polyethylenes used for this purpose should have a high mechanical strength and stiffness in order to be suitable to produce thin-walled injection-molded parts. In addition, the material has to have a high degree of environmental stress cracking resistance. If the finished parts are used as food packaging, the material also has to have excellent organoleptic properties. In addition, for the above-mentioned injection-molding applications, the molding composition has to be easily processable, in particular by injection molding.

Polyethylene molding compositions having a unimodal molecular mass distribution, i.e. comprising a single ethylene polymer fraction having a predetermined molecular weight, have disadvantages in terms of processability, environmental stress cracking resistance and mechanical toughness, which are unsatisfactory for injection-molding applications.

In comparison, molding compositions having a bimodal molecular mass distribution represent a technical step forward. A molding composition for injection-molded finished parts based on polyethylene which has a bimodal molecular mass distribution can be processed relatively easily and exhibits better mechanical properties compared to conventional unimodal molding compositions. Although a molding composition having a bimodal molecular mass distribution is easier to be processed and has a better environmental stress cracking resistance and a higher mechanical strength at the same density with respect to an unimodal molding composition, the mechanical properties, and in particular the environmental stress cracking resistance, the strength and the stiffness of a bimodal molding composition nevertheless still need to be improved.

It is therefore an object of the present invention to provide a molding composition which is based on polyethylene and has significant advantages in respect of mechanical strength combined with increased stiffness and in respect of environmental stress cracking resistance, while retaining good processability when processed by injection molding.

This object is achieved by a molding composition having a multimodal molecular mass distribution comprising from 25 to 50% by weight of a low molecular weight ethylene homopolymer A, from 28 to 50% by weight of a high molecular weight ethylene copolymer B and 15 to 40% by weight of an ultrahigh molecular weight ethylene copolymer C, with all percentages being based on the total weight of the molding composition, wherein the molding composition has a density at a temperature of 23° C. in the range from 0.940 to 0.957 g/cm³, an MFR (190° C./2.16 kg) in the range from 0.5 to 4 dg/min and a viscosity number $VN_3$ of the mixture of ethylene homopolymer A, copolymer B and ethylene copolymer C, measured in accordance with ISO/R 1191 in decalin at a temperature of 135° C., in the range from 150 to 300 cm³/g.

The expressions "low molecular weight ethylene homopolymer A", "high molecular weight ethylene copolymer B" and "ultrahigh molecular weight ethylene copolymer C" refer to an ethylene homopolymer A, an ethylene copolymer B and an ethylene copolymer C, respectively, which have different, increasing molecular weights.

Thanks to this combination of features, and in particular thanks to the multimodal molecular mass distribution, these particular ranges for MFR, viscosity number $VN_3$ and density, the polyethylene molding composition of the present invention can be advantageously processed more easily, while having improved strength and stiffness.

The high molecular weight ethylene copolymer B and/or the ultrahigh molecular weight ethylene copolymer C are preferably copolymers of ethylene and at least a further olefin which preferably has from 4 to 8 carbon atoms. Ethylene is thus used as monomer and the comonomer used is preferably 1-butene, 1-pentene, 1-hexene, 1-octene, 4-methyl-1-pentene or a combination of these. Preferred comonomers are 1-butene, 1-hexene and 4-methyl-1-pentene. Particular preference is given to 1-butene.

The high molecular weight copolymer B preferably comprises at least one comonomer in an amount in the range from 1 to 10% by weight, more preferably in the range from 1 to 8% by weight, in particular in the range from 1 to 6% by weight, based on the weight of copolymer B.

The ultrahigh molecular weight copolymer C preferably comprises at least one comonomer in an amount in the range from 1 to 10% by weight, more preferably in the range from 1 to 8% by weight, particularly preferably in the range from 1 to 6% by weight, based on the weight of copolymer C.

These preferred amounts of comonomers make it possible to achieve an improved environmental stress cracking resistance. Within these preferred ranges, the polyethylene molding composition advantageously has a further improved combination of mechanical properties.

The ultrahigh molecular weight ethylene copolymer C preferably comprises one or more of the comonomers mentioned above by way of example.

The polyethylene molding composition preferably has a density at a temperature of 23° C. in the range from 0.942 to 0.957 g/cm$^3$, more preferably in the range from 0.945 to 0.957 g/cm$^3$, in particular in the range from 0.948 to 0.957 g/cm$^3$.

In this way, the stiffness of the polyethylene molding composition is advantageously further increased without substantially altering the other mechanical properties and the processability.

The polyethylene molding composition preferably has a viscosity number $VN_3$ of the mixture of ethylene homopolymer A, ethylene copolymer B and ethylene copolymer C, measured in accordance with ISO/R 1191 in decalin at a temperature of 135° C., in the range from 150 to 280 cm$^3$/g, more preferably in the range from 180 to 260 cm$^3$/g, in particular in the range from 180 to 240 cm$^3$/g.

The polyethylene molding composition preferably has a melt flow index in accordance with ISO 1133, condition D, expressed as MFR(190° C./2.16 kg), in the range from 0.5 to 3 dg/min, more preferably in the range from 0.7 to 3 dg/min, in particular in the range from 1 to 2.7 dg/min.

The polyethylene molding composition is preferably prepared by means of a multistage reaction sequence comprising successive polymerization steps. For example, when the reaction sequence has three stages, a trimodal polyethylene molding composition is produced, while when the reaction sequence has four stages, a quadrimodal polyethylene molding composition is produced.

In order to obtain a multimodal polyethylene, the polymerization can be carried out in a multistage process, i.e. in a plurality of stages carried out in respective reactors connected in series, with the molecular mass preferably being regulated in each case by means of a molar mass regulator, preferably hydrogen. In particular, the polymerization process is preferably carried out with the highest hydrogen concentration being set in the first reactor. In the subsequent, further reactors, the hydrogen concentration is preferably gradually reduced, so that the hydrogen concentration used in the third reactor is lower with respect to hydrogen concentration used in the second reactor. Preferably, in the second reactor and in the third reactor a predetermined comonomer concentration is used, preferably increasing from the second reactor to the third reactor. As stated above, in the stages where a copolymer fraction is prepared, preferably in the second reactor and in the third reactor, ethylene is thus used as monomer and an olefin having from 4 to 8 carbon atoms is preferably used as comonomer.

The molecular mass distribution of the polyethylene molding composition of the present invention is preferably trimodal. In this way, it is possible to obtain the above-mentioned advantageous combination of properties without excessively complicating the production process by providing three reactors in series and thus advantageously containing the dimensions of the plant. So, in order to prepare a trimodal polyethylene molding composition, the polymerization of ethylene is preferably carried out in a continuous process performed in three reactors connected in series, wherein different reaction conditions are respectively set in the three reactors. Preferably, the polymerization is performed in suspension: in the first reactor, a suitable catalyst, for example a Ziegler catalyst, is preferably fed in together with suspension medium, cocatalyst, ethylene and hydrogen. Preferably, no comonomer is introduced in the first reactor. The suspension from the first reactor is then transferred to a second reactor in which ethylene, hydrogen and preferably also a predetermined amount of comonomer, for example 1-butene, are added. The amount of hydrogen fed in the second reactor is preferably reduced compared to the amount of hydrogen fed in the first reactor. The suspension from the second reactor is transferred to the third reactor. In the third reactor, ethylene, hydrogen and, preferably, a predetermined amount comonomer, for example 1-butene, preferably in an amount higher than the amount of comonomer used in the second reactor, are introduced. The amount of hydrogen in the third reactor is reduced compared to the amount of hydrogen in the second reactor. From the polymer suspension leaving the third reactor the suspension medium is separated and the resulting polymer powder is dried and then preferably pelletized.

The polyethylene is obtained by polymerization of the monomers, for example in suspension, preferably at temperatures in the range from 70 to 90° C., preferably from 80 to 90° C., at a preferred pressure in the range from 2 to 20 bar, preferably from 2 to 10 bar. The polymerization is preferably carried out in the presence of a suitable catalyst, for example a Ziegler catalyst, preferably sufficiently active to ensure a predetermined productivity of multistage process. The Ziegler catalyst is preferably composed of a transition metal compound and an organoaluminum compound.

The preferred trimodality, i.e. the preferred trimodal configuration of the molecular mass distribution curve, can be described in terms of the position of the centers of gravity of the three individual molecular mass distributions by means of the viscosity numbers VN in accordance with ISO/R 1191 of the polymers obtained after each polymerization stages.

The low molecular weight ethylene homopolymer A is preferably formed in the first polymerization step: in this preferred embodiment, the viscosity number $VN_1$ measured on the polymer obtained after the first polymerization step is the viscosity number of the low molecular weight ethylene homopolymer A and is preferably in the range from 50 to 150 cm$^3$/g, more preferably from 60 to 120 cm$^3$/g, in particular from 65 to 100 cm$^3$/g.

According to alternative embodiments, either the high molecular weight ethylene copolymer B or the ultrahigh molecular weight copolymer C may be formed in the first polymerization step.

The high molecular weight ethylene copolymer B is preferably formed in the second polymerization step.

According to a particularly preferred embodiment, in which the low molecular weight ethylene homopolymer A is formed in the first polymerization step and the high molecular weight ethylene copolymer B is formed in the second polymerization step, the viscosity number $VN_2$ measured on the polymer obtained after the second polymerization step is the viscosity number of the mixture of the low molecular weight ethylene homopolymer A and of the high molecular weight ethylene copolymer B. $VN_2$ is preferably in the range from 70 to 180 cm$^3$/g, more preferably from 90 to 170 cm$^3$/g, in particular from 100 to 160 cm$^3$/g.

In this preferred embodiment, starting from these measured values of $VN_1$ and $VN_2$, the viscosity number $VN_B$ of the high molecular weight ethylene copolymer B can be for example calculated from the following empirical formula:

$$VN_B = \frac{VN_2 - w_1 \cdot VN_1}{1 - w_1}$$

where $w_1$ is the proportion by weight of the low molecular weight ethylene homopolymer formed in the first polymerization step, measured in % by weight, based on the total weight of the polyethylene having a bimodal molecular weight distribution formed in the first two steps.

The ultrahigh molecular weight ethylene copolymer C is preferably formed in the third polymerization step: in this preferred embodiment, as well as in the alternative embodiments where a different order of polymerization is provided, the viscosity number $VN_3$ measured on the polymer obtained after the third polymerization step is the viscosity number of the mixture of the low molecular weight ethylene homopolymer A, of the high molecular weight ethylene copolymer B and of the ultrahigh molecular weight ethylene copolymer C. $VN_3$ is preferably within the preferred ranges already defined above, i.e. from 150 to 300 cm$^3$/g, preferably from 150 to 280 cm$^3$/g, more preferably in the range from 180 to 260 cm$^3$/g, in particular in the range from 180 to 240 cm$^3$/g.

In this preferred embodiment, starting from these measured values of $VN_2$ and $VN_3$, the viscosity number $VN_C$ of the ultrahigh molecular weight copolymer C formed in the third polymerization step can be for example calculated from the following empirical formula:

$$VN_C = \frac{VN_3 - w_2 \cdot VN_2}{1 - w_2}$$

where $w_2$ is the proportion by weight of the polyethylene having a bimodal molecular weight distribution formed in the first two steps, measured in % by weight, based on the total weight of the polyethylene having a trimodal molecular weight distribution formed in all three steps.

Although the way to calculate the viscosity numbers of each ethylene polymer fraction of the polyethylene molding composition has been given with reference to a preferred case in which the low molecular weight ethylene homopolymer A, the high molecular weight copolymer B and, respectively, the ultra high molecular weight copolymer C are obtained in this order, this calculation method may applied also to different polymerization orders. In any case, in fact, independently from the order of production of the three ethylene polymer fractions, the viscosity number of the first ethylene polymer fraction is equal to the viscosity number $VN_1$ measured on the ethylene polymer obtained after the first polymerization step, the viscosity number of the second ethylene polymer fraction can be calculated starting from the proportion by weight $w_1$ of the first ethylene polymer fraction formed in the first polymerization step, measured in % by weight, based on the total weight of the polyethylene having a bimodal molecular weight distribution formed in the first two steps and from the viscosity numbers $VN_1$ and $VN_2$ measured on the polymers obtained after the second and, respectively, the third polymerization step, while the viscosity number of the third ethylene polymer fraction can be calculated starting from the proportion by weight $w_2$ of the polyethylene having a bimodal molecular weight distribution formed in the first two steps, measured in % by weight, based on the total weight of the polyethylene having a trimodal molecular weight distribution formed in all three steps and from the viscosity numbers $VN_2$ and $VN_3$ measured on the polymers obtained after the second and, respectively, the third polymerization step.

The polyethylene molding composition of the invention may further comprise additional optional additives. Such additives are, for example, heat stabilizers, antioxidants, UV absorbers, light stabilizers, metal deactivators, peroxide-destroying compounds, basic costabilizers in amounts of from 0 to 10% by weight, preferably from 0 to 5% by weight, but also carbon black, fillers, pigments, flame retardants, or combinations of these in total amounts of from 0 to 50% by weight, based on the total weight of the mixture.

The molding composition of the invention can advantageously be injection-molded to produce injection-molded, preferably rotationally symmetric, finished parts, e.g. closures for blow-molded plastic parts or bottles.

EXAMPLES

Example 1

Invention

The polymerization of ethylene was carried out in a continuous process in three reactors connected in series. A Ziegler catalyst which had been prepared by the method disclosed by WO 91/18934, Example 2 under the operation number 2.2, was fed into the first reactor in an amount of 14.3 mmol/h, together with sufficient hexane as suspension medium, triethylaluminum as cocatalyst in an amount of 180 mmol/h, ethylene and hydrogen. The amount of ethylene (=51.7 kg/h) and the amount of hydrogen (=62 g/h) were set so that a proportion of 24% by volume of ethylene and a proportion of 68% by volume of hydrogen were measured in the gas space of the first reactor; the remainder was a mixture of nitrogen and vaporized suspension medium. The polymerization in the first reactor was carried out at a temperature of 84° C. The suspension from the first reactor was then transferred to a second reactor in which the proportion of hydrogen in the gas space had been reduced to 55% by volume and into which an amount of 54.5 kg/h of ethylene and also 450 g/h of 1-butene added via material dissolved in recirculated suspension medium were introduced. The reduction in the amount of hydrogen was obtained by means of intermediate $H_2$ depressurization. 40% by volume of ethylene, 55% by volume of hydrogen and 0.4% by volume of 1-butene were measured in the gas space of the second reactor; the remainder was a mixture of nitrogen and vaporized suspension medium. The polymerization in the second reactor was carried out at a temperature of 85° C. The suspension from the second reactor was transferred via a further intermediate $H_2$ depressurization, by means of which the amount of hydrogen in the gas space in the third reactor was set to 2.1% by volume, into the third reactor. An amount of 38.3 kg/h of ethylene and also an amount of 3900 g/h of 1-butene were introduced into the third reactor. A proportion of ethylene of 79% by volume, a proportion of hydrogen of 2.1% by volume and a proportion of 1-butene of 11% by volume were measured in the gas space of the third reactor; the remainder was a mixture of nitrogen and vaporized suspension medium. The polymerization in the third reactor was carried out at a temperature of 85° C. The suspension medium was separated from the polymer suspension leaving the third reactor and the remaining polymer powder was dried and pelletized.

Closures having a diameter of 40 mm and a wall thickness of 2 mm were injection-molded at a melt temperature of 210° C. and a holding pressure of 750 bar on a KM 250 injection-molding machine from Krauss Maffei (max. clamping force 2750 kN and a screw diameter of 50 mm) using a 4-cavity tool with screw. The surface temperature of the tool was 30° C. The closures produced had a defect-free surface.

The viscosity numbers as described above and the proportions $W_A$, $W_B$ and $W_C$ of polymer A, B and C for the polyethylene molding composition prepared as described in Example 1 are indicated in Table 1 below.

TABLE 1

| | Example 1 |
|---|---|
| $W_A$ [% by weight] | 36 |
| $W_B$ [% by weight] | 38 |
| $W_C$ [% by weight] | 26 |
| $VN_1$ [cm³/g] | 76 |
| $VN_2$ [cm³/g] | 130 |
| $VN_3$ [cm³/g] | 230 |
| Density [g/cm³] | 0.954 |
| MFR (190° C./2.16 kg)[dg/min] | 1.5 |
| ESCR [h] | 50 |
| ACN (−23° C.)[kJ/m²] | 5.5 |
| Spiral length [mm] | 175 |

The abbreviations in Table 1 have the following meanings:

$W_A$, $W_B$, $W_C$ = weight, in [%], of the low molecular weight ethylene homopolymer A, of the high molecular weight copolymer B and of the ultrahigh molecular weight ethylene copolymer C, respectively;

$VN_1$, $VN_2$, $VN_3$ = viscosity number, in [cm³/g], of the low molecular weight ethylene homopolymer A, of the mixture of polymer A and polymer B and of the mixture of ethylene homopolymer A, copolymer B and ethylene copolymer C, respectively, measured in accordance with ISO/R 1191 in decalin at a temperature of 135° C.;

density: measured at 23° C. in accordance with ISO 1183, in [g/cm³];

MFR(190° C./2.16 kg) = melt flow index in accordance with ISO 1133, condition D, in [dg/min];

ESCR = environmental stress cracking resistance measured by the method of M. Fleißner (Full Notch Creep Test), in [h], under the conditions: 80° C., 2.5 MPa, water/2% of Arkopal. This laboratory method is described by M. Fleißner in Kunststoffe 77 (1987), p. 45 ff., and corresponds to ISO/CD 16770. This publication shows that there is a relationship between the determination of slow crack growth in the creep test on test bars having a circumferential notch and the brittle branch of the long-term internal pressure test in accordance with ISO 1167. A shortening of the time to failure is achieved by shortening the crack initiation times by means of the notch (notch depth of 1.6 mm/razor blade) in 2% strength aqueous Arkopal solution as stress crack promoting medium at a temperature of 80° C. and a tensile stress of 2.5 MPa. The specimens are produced by sawing three test specimens having dimensions of 10 × 10 × 90 mm from a 10 mm thick pressed plate. The test specimens are notched around their circumference in the middle by means a razor blade in a notching apparatus constructed in-house (cf. FIG. 5 in the publication).;

ACN = notched impact toughness, measured in accordance with ISO 179-1/1 eA/DIN 53453 in [kJ/m²] at +23° C.;

spiral length = length of the spiral, in [mm], which is produced in the spiral test, where a spiral is injection molded from the polymer. As is known in injection-molding applications, the resulting length of a test spiral produced by injection molding is a measure of the processing behavior in injection-molding processes. The figures reported are based on an injection temperature of 190° C. at an injection pressure of 1050 bar and a wall thickness of the spirals of 1 mm.

Example 2

Comparative Example

The polymerization of ethylene was carried out in a continuous process in two reactors connected in series. A Ziegler catalyst which had been prepared by the method of WO 91/18934, Example 2, under the operation number 2.2, was fed into the first reactor in an amount of 14.3 mmol/h together with sufficient suspension medium, triethylaluminum as cocatalyst in an amount of 180 mmol/h, ethylene and hydrogen. The amount of ethylene (=71.5 kg/h) and the amount of hydrogen (=79 g/h) were set so that a proportion of 26% by volume of ethylene and a proportion of 61% by volume of hydrogen were measured in the gas space of the first reactor. In addition, a proportion of 1.2% by volume of 1-butene which had been introduced as dissolved 1-butene in recirculated suspension medium was measured; the remainder was a mixture of nitrogen and vaporized suspension medium. The polymerization in the first reactor was carried out at a temperature of 84° C. The suspension from the first reactor was then transferred to a second reactor in which the proportion of hydrogen in the gas space had been reduced to 19% by volume and into which an amount of 58.5 kg/h of ethylene plus 2350 l/h of 1-butene were introduced. The reduction in the amount of hydrogen was obtained by means of intermediate $H_2$ depressurization. 67% by volume of ethylene, 19% by volume of hydrogen and 6.5% by volume of 1-butene were measured in the gas space of the second reactor; the remainder was a mixture of nitrogen and vaporized suspension medium. The polymerization in the second reactor was carried out at a temperature of 85° C. The polymer suspension leaving the second reactor was, after the suspension medium had been separated off and the powder had been dried, passed to pelletization.

Closures having a diameter of 40 mm and a wall thickness of 2 mm were injection-molded at a melt temperature of 210° C. and a holding pressure of 750 bar on a KM 250 injection-molding machine from Krauss Maffei (max. clamping force 2750 kN and a screw diameter of 50 mm) using a 4-cavity tool with screw. The surface temperature of the tool was 30° C. The closures produced had a defect-free surface.

The viscosity numbers as described above and the proportions $W_A$, $W_B$ and $W_C$ of polymer A, B and C for the polyethylene molding composition prepared as described in the comparative example are indicated in Table 2 below.

TABLE 2

| | Example 2 (comparative example) |
|---|---|
| $W_A$ [% by weight] | 55 |
| $W_B$ [% by weight] | 45 |
| $VN_1$ [cm³/g] | 53 |
| $VN_2$ [cm³/g] | 160 |
| Density [g/cm³] | 0.951 |
| MFR (190° C./2.16 kg)[dg/min] | 1.0 |
| ESCR [h] | 12 |
| ACN (−23° C.)[kJ/m²] | 4.7 |
| Spiral length [mm] | 145 |

The invention claimed is:

1. A polyethylene molding composition comprising:
  (A) from 25 to 50% by weight, based on the total weight of the molding composition, of a low molecular weight ethylene homopolymer A wherein the homopolymer A has a viscosity number ($VN_1$) between 65 and 100 cm³/g;
  (B) from 28 to 50% by weight, based on the total weight of the molding composition, of a high molecular weight ethylene copolymer B comprising at least one comonomer in the range from 1 to 10% by weight, based on the weight of copolymer B wherein a mixture of homopolymer A and homopolymer B has a viscosity number ($VN_2$) between 100 to 160 cm³/g;
  (C) from 15 to 40% by weight, based on the total weight of the molding composition, of an ultrahigh molecular weight ethylene copolymer C wherein copolymer C comprises at least one comonomer in the range from 1 to 10% by weight, based on the weight of copolymer C wherein a mixture of homopolymer A, homopolymer B and copolymer C has a viscosity number ($VN_3$) between 150 to 240 cm³/g,
  wherein the polyethylene molding composition:
  (i) has a density between 0.948 to 0.957 g/cm³ measured at a temperature of 23° C.,
  (ii) has a melt flow rate (190° C./2.16 kg) between 1 to 2.7 dg/min; and
  (iii) has a multimodal molecular mass distribution wherein the composition is obtained in a three stage polymerization process using a magnesium titanium containing Ziegler catalyst, wherein the three reactors are connected in series, and wherein the product of the first reactor is transferred to the second reactor, and the product of the second reactor is transferred to the third reactor, the Ziegler catalyst being added to the first reactor and used in each of the three reactors.

2. The polyethylene molding composition according to claim 1, wherein the high molecular weight ethylene copolymer B and the ultrahigh molecular weight ethylene copolymer C are copolymers of ethylene and at least a further olefin having from 4 to 8 carbon atoms.

3. The polyethylene molding composition according to claim 2, wherein the olefin is selected from 1-butene, 1-pentene, 1-hexene, 1-octene, 4-methyl-1-pentene or a combination thereof.

* * * * *